UNITED STATES PATENT OFFICE.

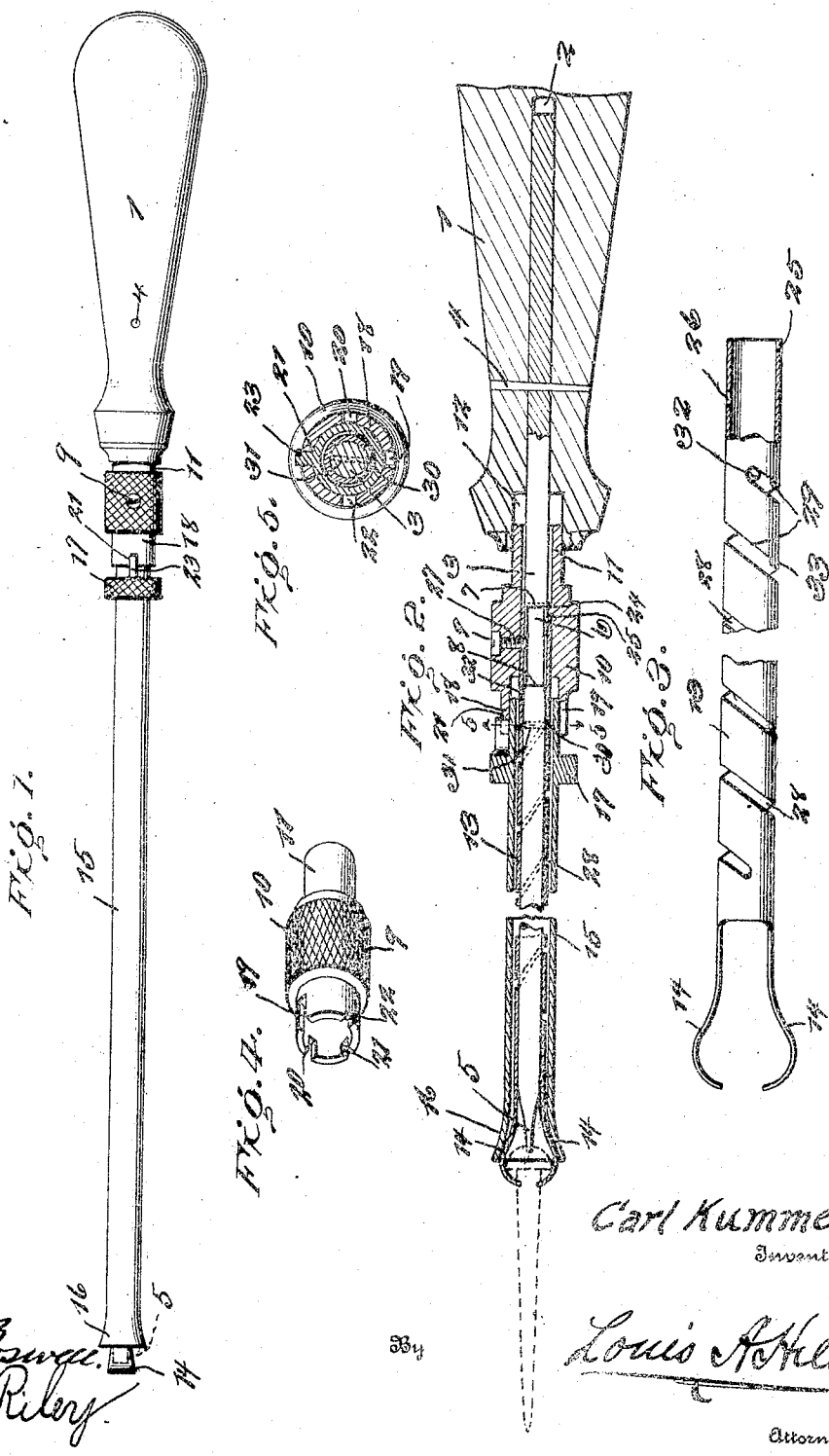

CARL KUMMER, OF HAMPSHIRE, ILLINOIS.

SCREW-DRIVER.

No. 924,999.  Specification of Letters Patent.  Patented June 15, 1909.

Application filed May 16, 1907. Serial No. 374,097.

*To all whom it may concern:*

Be it known that I, CARL KUMMER, a citizen of the United States, residing at Hampshire, in the county of Kane and State of Illinois, have invented certain new and useful Improvements in Screw-Drivers, of which the following is a specification.

This invention relates to screw drivers and the object of said invention is to provide a device for holding the screw while the same is being driven.

A further object is to construct a screw driver in such a manner as to hold screws of various sizes and provide an adjustment for regulating the screw holding member to the various sized screws.

This invention comprises further objects and combinations of elements which will be hereinafter more fully described.

In the drawings, Figure 1 is a side elevation of the screw driver. Fig. 2 is a sectional view taken at right angles to Fig. 1, longitudinally through the screw driver. Fig. 3 is a detail side elevation of the resilient grip and its coiled shank portion. Fig. 4 is a detail perspective view of the nut carried by the screw driver. Fig. 5 is a sectional view on the line 5—5 of Fig. 2.

In the drawings 1 is the handle of the screw driver, which is provided with a longitudinal bore 2, in which the end of the driver spindle is fixed by means of a pin 4. This spindle is provided with the screw engaging portion 5. The spindle is provided with the reduced portion 6, which forms shoulders 7 and 8, which limit the movement of the driver spindle by their engagement with the screw 9, which passes through the nut 10. This nut is provided with the reduced portion 11, which enters the hollow portion 12 of the handle when the device is being adjusted.

Surrounding the spindle is the coiled shank 13 of the spring arms 14, which are adapted to hold the screw in place while the same is being driven. Surrounding the coil shank is a sleeve 15, which is flared at one end as shown at 16. The other end of this sleeve is provided with the milled flange 17 which carries the rib 23, which is adapted to enter the notches 19, 20, 21 and 22 in the nut 10. It will be seen that as the sleeve 15 is moved forward or backward its flared end will either allow the spring arms to open or else said arms will close as they come in contact with said flared end. It is by the back ward and forward movement of this sleeve that the spring arms are regulated to fit different sized screws.

The spiral shank is provided with the spiral slot 28, which is formed larger at 29 to receive a lug on the driver spindle, which is formed by the insertion of a pin through the said spindle and allowing one end of said pin to extend from the spindle far enough to engage the spiral slot. This will allow the driver spindle to be rotated a few turns without the coiled shank being rotated, the extent of this rotating movement being limited by the shoulders 7 and 8 and by the fact that the spiral slot is only made large enough to receive the pin from the point 28 to the point 29. The driver spindle revolves independent of the sleeves which surround it one or more turns, the number of turns being regulated by the length of the enlarged portion of the spiral slot in the spring sleeve, thereby forcing the screw against the spring retaining jaws. The notches formed in the nut 10 are of different lengths; if the head of the screw is large the rib or projection 23 of the flange 17 is allowed to enter one of the deeper notches which will hold the sleeve against further rotation. It will be seen that as the rib 23 is forced into the notches the extreme end of the sleeve will be received by the nut 10 which is cut away for that purpose. When the screw has been driven the spring arms or jaws may be removed by withdrawing the rib 23 from the notch in which it has been resting. It will be noticed that screws of various sizes may be held by the arms 14, the said jaws may be brought close together by sliding the sleeve forward and holding it there by means of one of the smaller notches.

From the foregoing, the essential features, elements and the operation of the device, together with the simplicity thereof will be clearly apparent.

Having thus described the invention, what is claimed is:—

1. In a screw driver; a driver spindle; a handle therefor; a resilient screw-holding grip having a coiled shank forming a spiral slot having a larger portion thereof; an adjustable member to regulate the tension of the resilient screw-holding grip; said driver spindle having a lug to move in the larger portion of the slot; and a nut to coöperate with said adjustable member to hold the same in adjusted position.

2. In a screw driver; a driver spindle; a handle therefor; a resilient screw-holding grip having a spiral slot; said driver spindle having a lug to engage said slot to cause the spindle to have a spiral movement; an adjustable sleeve to regulate the tension of the grip; and a nut to coöperate therewith to hold the sleeve in an adjusted position.

3. In a screw driver; a driver spindle; a handle therefor; a resilient screw-holding grip having a spiral slot; said driver spindle having a lug to engage said slot to cause the spindle to have a spiral movement; an adjustable sleeve to regulate the tension of the grip; a nut to coöperate therewith to hold the sleeve in an adjusted position; said driver spindle having a reduced portion forming the shoulders; said nut having means to be engaged by said shoulders to limit the movement of said driver spindle.

In testimony whereof I have affixed my signature, in presence of two witnesses.

CARL KUMMER.

Witnesses:
CHAS. W. JOHNSON,
CHAS. S. BACKUS.